United States Patent
Li et al.

(10) Patent No.: US 10,284,064 B2
(45) Date of Patent: May 7, 2019

(54) BRUSHLESS DIRECT CURRENT MOTOR AND ROTOR THREAD THEREOF HAVING FIXING PINS

(71) Applicant: JOHNSON ELECTRIC INTERNATIONAL, Murten (CH)

(72) Inventors: Yong Bin Li, Shenzhen (CN); Long Shun Jiang, Shenzhen (CN); Xian Chun Fan, Shenzhen (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 811 days.

(21) Appl. No.: 14/818,711

(22) Filed: Aug. 5, 2015

(65) Prior Publication Data

US 2016/0043620 A1 Feb. 11, 2016

(30) Foreign Application Priority Data

Aug. 6, 2014 (CN) .......................... 2014 1 0385454
Jul. 23, 2015 (CN) .......................... 2015 1 0441966

(51) Int. Cl.
*H02K 1/27* (2006.01)
*H02K 21/14* (2006.01)
*H02K 1/28* (2006.01)

(52) U.S. Cl.
CPC ........... *H02K 21/14* (2013.01); *H02K 1/2773* (2013.01); *H02K 1/27* (2013.01); *H02K 1/28* (2013.01)

(58) Field of Classification Search
CPC .......... H02K 1/27; H02K 1/2773; H02K 1/28; H02K 21/14
USPC .... 310/156.13, 156.22, 156.47, 156.56, 217, 310/89
See application file for complete search history.

(56) References Cited

U.S. PATENT DOCUMENTS

| | | | | |
|---|---|---|---|---|
| 4,543,506 A * | 9/1985 | Kawada | ............... | H02K 1/2773 310/156.22 |
| 6,426,576 B1 * | 7/2002 | Varenne | ............... | H02K 1/2773 310/156.09 |
| 6,703,741 B1 * | 3/2004 | Ifrim | ............... | H02K 1/2773 310/156.19 |
| 7,332,845 B2 | 2/2008 | Heideman et al. | | |
| 2005/0073204 A1 * | 4/2005 | Puterbaugh | .............. | H02K 5/10 310/89 |
| 2006/0061227 A1 * | 3/2006 | Heideman | ............ | H02K 1/2773 310/156.56 |
| 2010/0289367 A1 * | 11/2010 | Lau | .......................... | H02K 1/30 310/156.09 |
| 2011/0254399 A1 * | 10/2011 | Blanc | ................... | H02K 1/2773 310/156.22 |
| 2012/0181880 A1 * | 7/2012 | Zhao | ................... | H02K 1/2773 310/43 |

* cited by examiner

*Primary Examiner* — Bernard Rojas
*Assistant Examiner* — Rashad H Johnson
(74) *Attorney, Agent, or Firm* — Muncy, Geissler, Olds & Lowe, P.C.

(57) ABSTRACT

A BLDC motor includes a stator and a rotor. The rotor includes a shaft, first and second end plates, a plurality of cores arranged between the first and second end plates, a plurality of magnets, and a housing. The cores are evenly spaced from each other in the circumferential direction. A space is formed between neighboring cores. Each space receives one magnet. The magnets are magnetized circumferentially such that side surfaces of the magnets have corresponding polarities. The housing is made of magnetically permeable material, surrounding and covering radially outer ends of the magnets and cores.

22 Claims, 11 Drawing Sheets

US 10,284,064 B2

BRUSHLESS DIRECT CURRENT MOTOR AND ROTOR THREAD THEREOF HAVING FIXING PINS

CROSS REFERENCE TO RELATED APPLICATIONS

This non-provisional patent application claims priority under 35 U.S.C. § 119(a) from Patent Application No. 201410385454.5 filed in The People's Republic of China on Aug. 6, 2014, and from Patent Application No. 201510441966.3, filed in The People's Republic of China on Jul. 23, 2015, the entire contents of which are hereby incorporated by reference.

FIELD OF THE INVENTION

This invention relates to brushless direct current motors, and in particular, to a rotor of a brushless direct current motor.

BACKGROUND OF THE INVENTION

With the development of industry, power machinery becomes more and more important in various production fields. Brushless direct current (BLDC) motors, which are excellent in power matching, are known to be used in a variety of power equipment.

Generally, a rotor of a BLDC motor in the art is designed to provide high magnetic flux density, in order to provide high power density. Due to limitations in the size and material of the rotor, the power density of the motor is accordingly limited.

Therefore, the skilled person in the art seeks to provide a motor having a rotor which is reliable and capable of providing high power density.

SUMMARY OF THE INVENTION

Accordingly, in one aspect thereof, the present invention provides a rotor of a motor, comprising: a shaft; a first end plate comprising a first main body and a plurality of first pins perpendicular to the first main body; a second end plate comprising a second main body and a plurality of second pins perpendicular to the second main body; a plurality of cores arranged between the first and second end plates, the cores being evenly spaced from each other in a circumferential direction, a space being defined between adjacent cores, each of the cores defining a through hole with one of the first pins and one of the second pins inserted therein, a sum of the lengths of the first and second pins in the same through hole being not larger than the length of the through hole; and a plurality of magnets, each of the magnets being received in a respective space between the cores.

Preferably, the first pins comprise a plurality of first long pins and a plurality of first short pins, the second pins comprise a plurality of second long pins and a plurality of second short pins, each first long pin and a corresponding second short pin are in the same through hole, each first short pin and a corresponding second long pin are in the same through hole, and a sum of the lengths of the first short pin and corresponding second long pin is the same as a sum of the lengths of the first long pin and corresponding second short pin.

Preferably, the first long pins and first short pins are alternating in the circumferential direction, and the second long pins and second short pins are alternating in the circumferential direction, a gap being defined between the first short pin and corresponding second long pin, and a gap being defined between the first long pin and corresponding second short pin.

Preferably, the length of the first long pin is twice that of the first short pin.

Preferably, a cross section of the through hole corresponds to a cross section of the first and second pins.

Preferably, the cross sections of the first and second pins are oval-shaped.

Preferably, a housing covers and surrounds the magnets and cores, the housing being made of magnetically permeable material.

Preferably, the housing is made of stainless steel.

Preferably, the housing comprises two separate cylinders.

Preferably, the shaft is fixed with the first end plate though inserting molding.

According to a second aspect, the present invention provides a rotor of a motor, comprising: a shaft; a first end plate; a second end plate; a plurality of cores arranged between the first and second end plates, the cores being evenly spaced from each other in a circumferential direction, a space being formed between adjacent cores; a plurality of magnets, each of the magnets being received in a respective space between the cores, the magnets being magnetized circumferentially to make side surfaces thereof in the circumferential direction with corresponding polarities; and a housing made of magnetically permeable material, the housing surrounding and covering outer surfaces of the magnets and cores in the radial direction.

Preferably, at least one of the first and second end plates forms fixing pins, the cores defining through holes corresponding to the pins.

Preferably, the pins comprise a plurality of first long pins and a plurality of first short pins extending from the first end plate, and a plurality of second long pins and a plurality of second short pins extending from the second end plate, each of the first long pins and a corresponding second short pin being inserted in a corresponding through hole from respective ends of the core, and each of the first short pins and a corresponding second long pin being inserted in a corresponding though hole from respective ends of the core.

Preferably, the housing is made of stainless steel, and a thickness of the housing is from 0.1 to 0.3 mm.

Preferably, an inner surface of the magnet in the radial direction extends beyond the cores, and is located inside the cores.

Preferably, the magnet is cuboid-shaped and symmetric.

Preferably, one of the housing and first end plate defines a groove, and the other one of the housing and first end plate defines a tab; one of the housing and second end plate defines a groove, and the other one of the housing and second end plate defines a tab, the tabs being engaged with the grooves to connect the housing and the first and second plates together.

According to a third aspect, the present invention provides a brushless direct current motor, comprising: a stator; and a rotor comprising: a shaft; a first end plate; a second end plate; a plurality of cores arranged between the first and second end plates, the cores being evenly spaced from each other in a circumferential direction, a space being formed between adjacent cores; a plurality of magnets, each of the magnets being received in a respective space between the cores, the magnets being magnetized circumferentially to make side surfaces thereof in the circumferential direction with corresponding polarities; and a housing made of magnetically permeable material, the housing surrounding and covering outer surfaces of the magnets and cores in the radial direction.

Preferably, an air gap between an outer surface of the housing and the stator is from 0.1 to 0.7 mm.

Preferably, a plurality of first long pins and a plurality of first short pins extend from the first end plate, and a plurality of second long pins and a plurality of second short pins extend from the second end plate, each of the first long pins and a corresponding second short pin being inserted in a corresponding through hole from respective ends of the core, and each of the first short pins and a corresponding second long pin being inserted in a though hole from respective ends of the core.

Preferably, the housing is made of stainless steel.

Optionally, a thickness of the housing is from 0.1 to 0.3 mm.

Preferably, the magnet is cuboid-shaped and symmetric, an inner surface of the magnet in the radial direction extending beyond the cores and located inside the cores.

Preferably, one of the housing and first end plate defines a groove, and the other one of the housing and first end plate defines a tab; one of the housing and second end plate defines a groove, and the other one of the housing and second end plate defines a tab, the tabs being engaged with the grooves to connect the housing and the first and second end plates together.

For the present invention, preferred embodiments can be obtained by any suitable combination of the above preferred features based on common sense.

Contrary to conventional wisdom, the present invention has a rotor with a housing made of magnetic material. Also, pins of the rotor end plates are designed to be of a specific length, thus stress in the rotor is dispersed to make the rotor more stable and reliable.

BRIEF DESCRIPTION OF THE DRAWINGS

Preferred embodiments of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
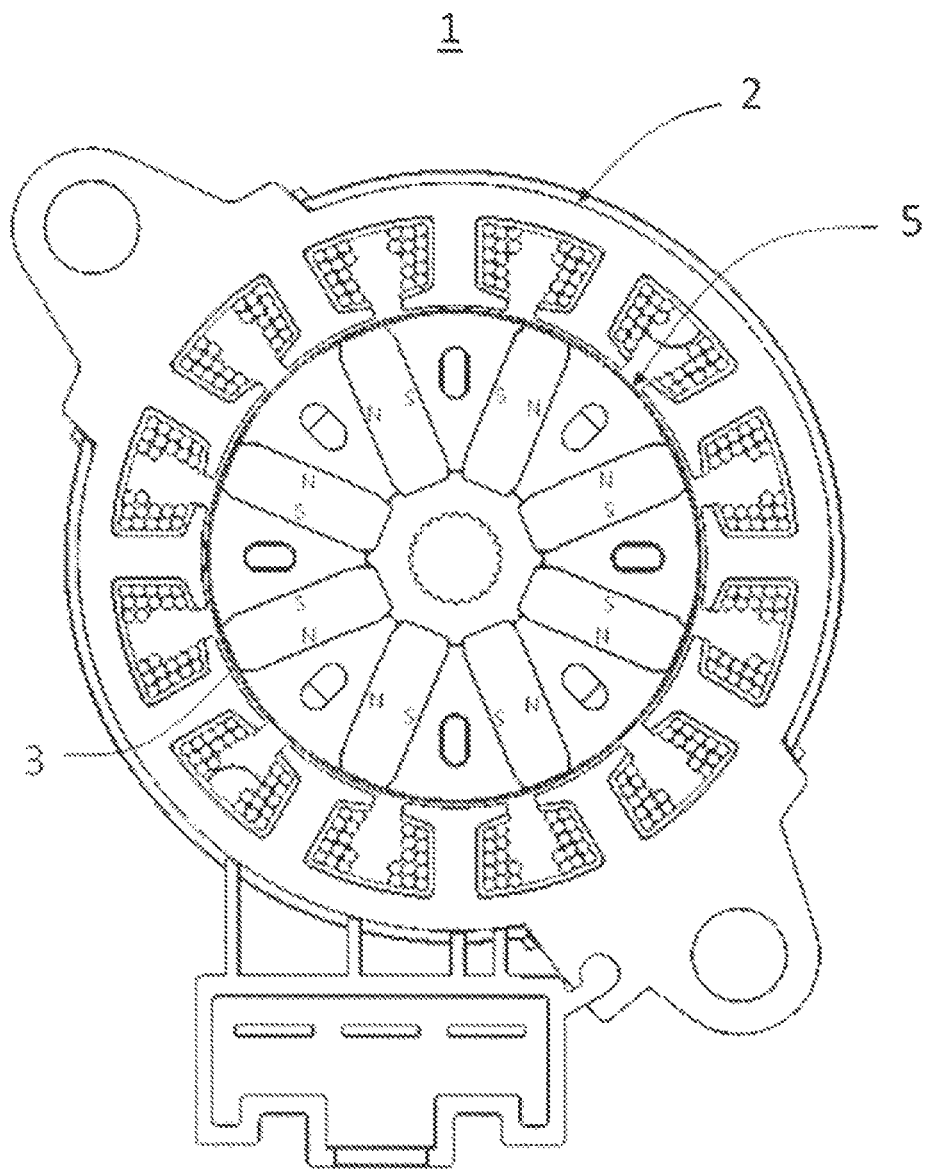
FIG. 1 is a cross section of a BLDC motor according to a preferred embodiment of the present invention.

FIG. 1 shows an isometric view of a BLDC motor 1 according to a first preferred embodiment of the present invention. The motor 1 includes a wound stator 2 and a permanent magnet rotor 5 being rotatable relative to the stator 1. An air gap 3 is defined between an inner surface of the stator 2 and an outer surface of the rotor 5, allowing the rotor to rotate with respect to the stator.

Figure 2:
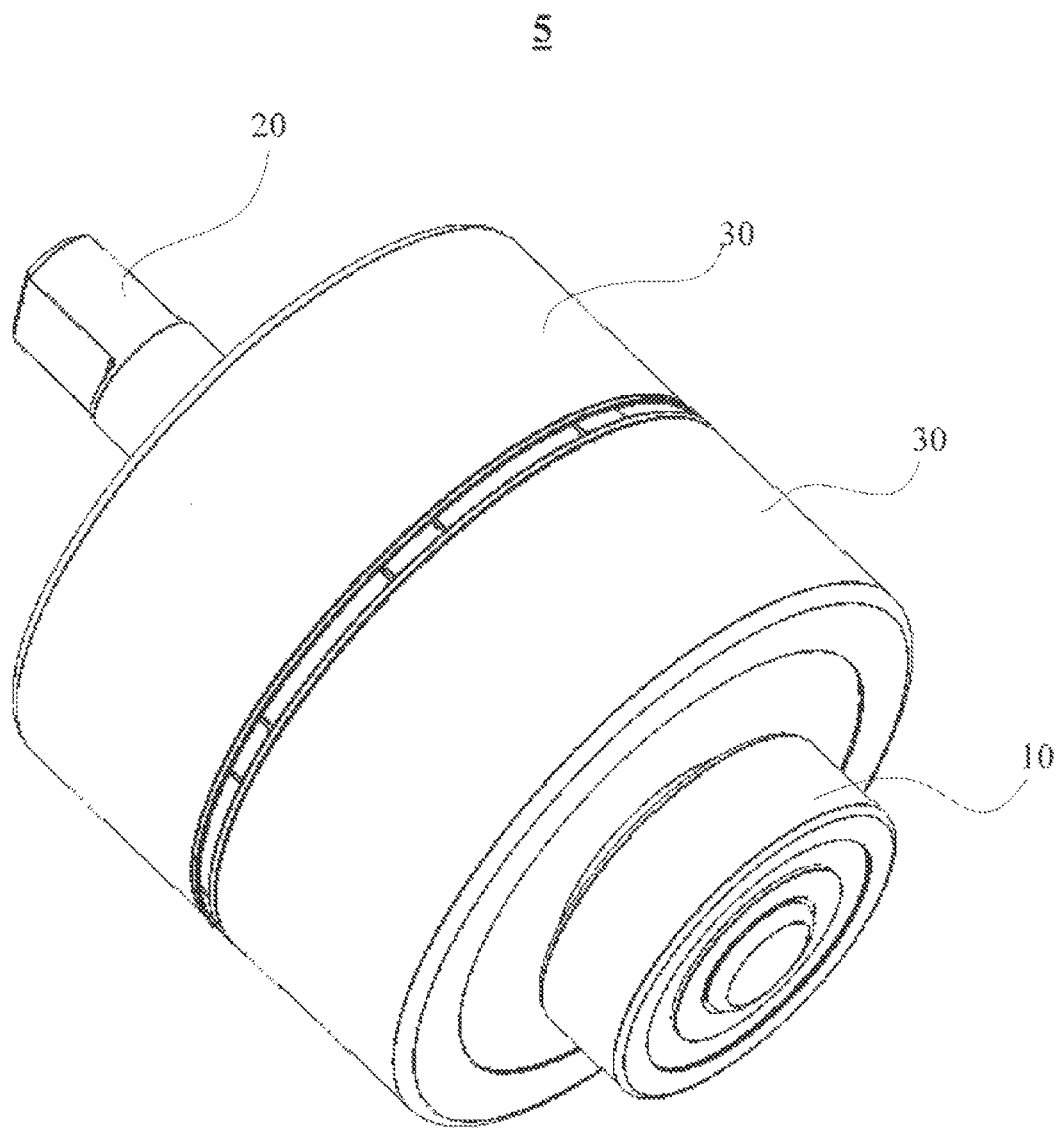
FIG. 2 is an isometric view of a rotor of the BLDC motor of FIG. 1.
Figure 3:
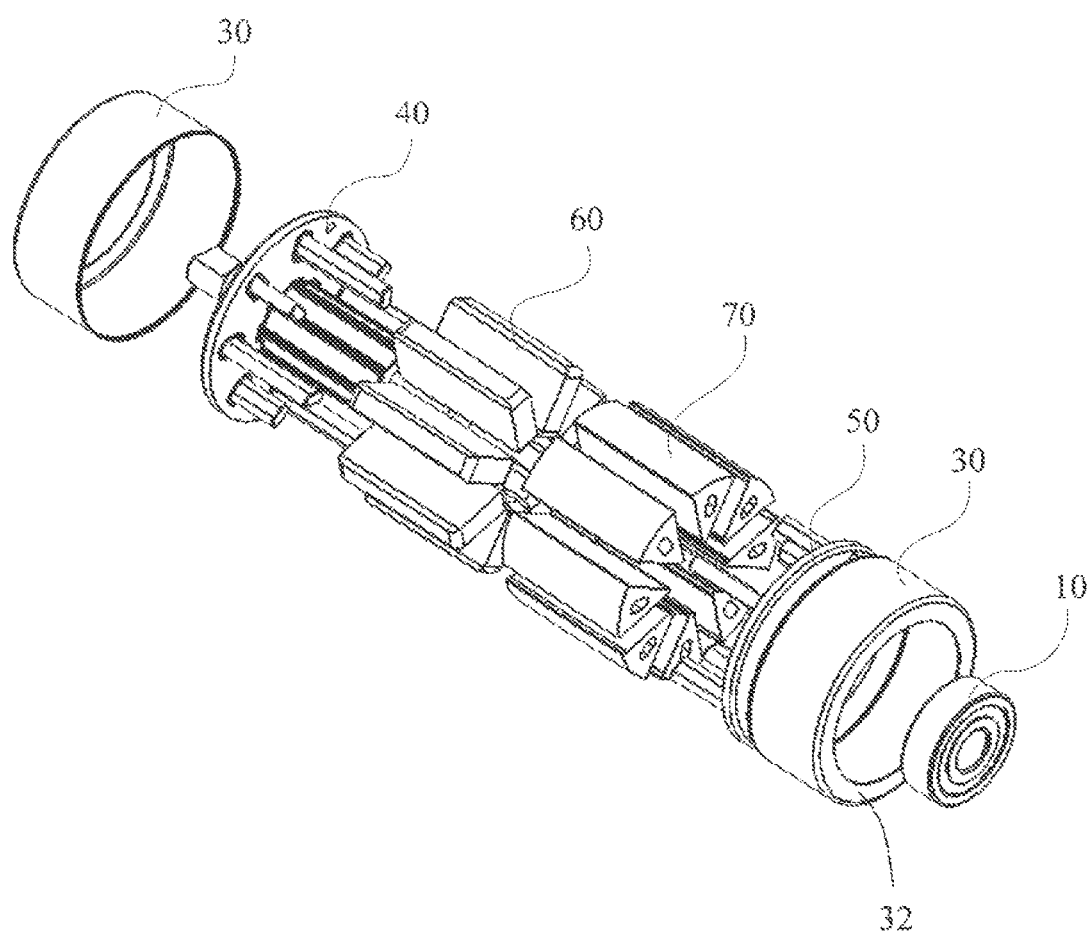
FIG. 3 is an exploded view of the rotor of FIG. 2.
Figure 4:
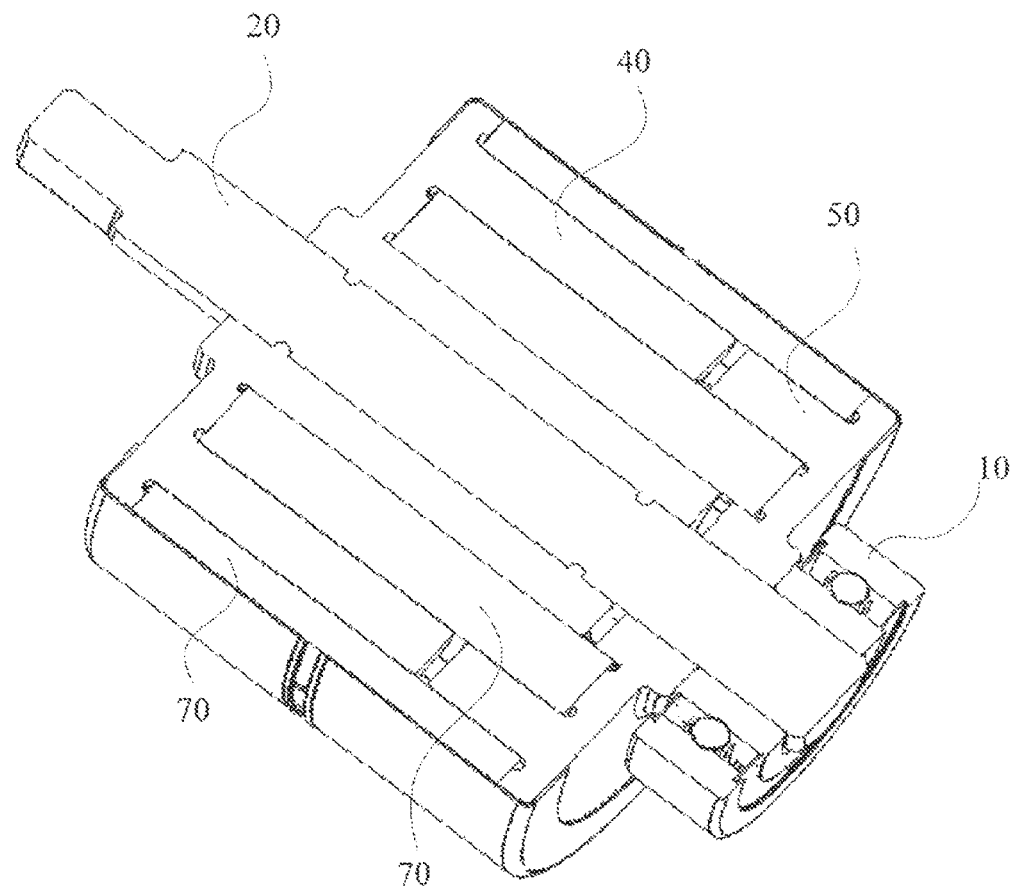
FIG. 4 shows an axial section of the rotor of FIG. 2.

FIGS. 2 to 4 show the rotor 5 of the motor 1 of FIG. 1. In this embodiment, the rotor 5 is disposed within the stator 2. The rotor 5 includes a shaft 20, magnets 60, cores 70, end plates 40 and 50, and a housing 30. There are multiple magnets 60 and cores 70 and they are alternately arranged in the circumferential direction. The magnets 60 and cores 70 cooperatively form a column disposed about the shaft 20, The end plates 40 and 50 are arranged at respective ends of the column and the housing 30 surrounds the column and the end plates. The shaft 20 extends through the column in an axial direction.

The housing 30 is made of magnetically permeable material, preferably stainless steel. In this embodiment, the housing 30 is made in two parts. Each housing part forms a hollow cylinder with a flange 32 extending radially inward from an end of the cylinder. The two parts of the housing 30 are mounted from opposite ends of the magnets 60 and cores 70, respectively. The two flanges 32 abut the end plates 40 and 50, respectively. The two cylinders cooperatively hold the magnets 60 and cores 70 therein. Thus, the rotor 5 is pre-assembled as a complete unit. Preferably, inner surfaces of the housing parts and/or outer surfaces of the magnets 60 and cores 70 are coated with glue, to fixed the housing 30 to the magnets 60 and cores 70. Preferably, a thickness of the housing 30 in the radial direction, i.e., a thickness between the inner and outer surfaces of the housing 30, is about 0.1 to 0.3 mm. A bearing 10 is mounted at each end of the rotor 5, for rotatably mounting the rotor to the stator 2.

Figure 5:
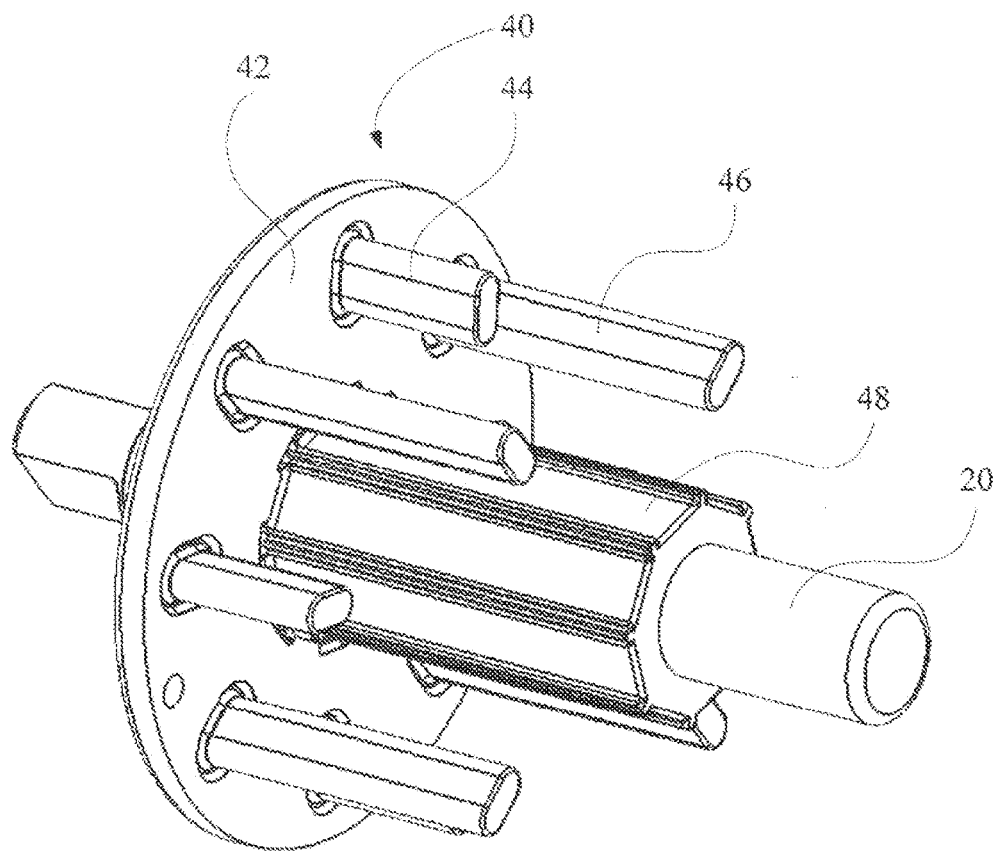
FIG. 5 is an isometric view of a first end plate of the rotor of FIG. 2.

FIG. 5 shows the first end plate 40 of the rotor 5 of FIG. 2. In this embodiment, the first end plate 40 includes a first main body 42, a plurality of first pins 44, 46, and a first sleeve 48. The first main body 42 is generally disc-shaped. The first pins 44, 46 include a plurality of first short pins 44 and a plurality of first long pins 46. The first pins 44, 46 are fixed on a surface of the first main body 42, and are arranged around the axis of the first main body 42 and evenly spaced from each other. Each of the first pins 44, 46 extends perpendicularly from the surface of the first main body 42.

Figure 7:
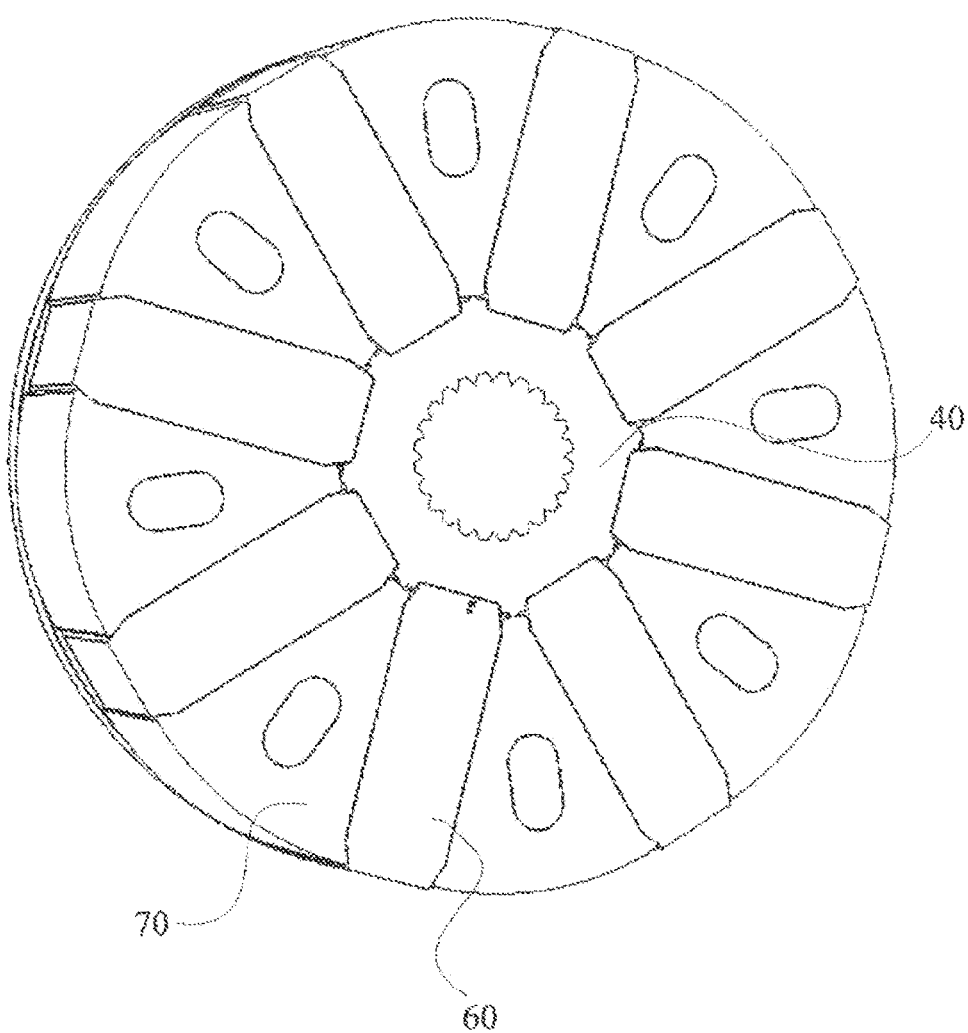
FIG. 7 shows a cross section of the rotor of FIG. 2.

The first sleeve 48 is arranged at the central portion of the first main body 42. The first sleeve 48 is generally prismatic. In this embodiment, a transverse section of the first sleeve 48 is generally octagon-shaped, as shown in FIG. 7. Correspondingly, there are eight magnets 60 and eight cores 70. The eight sidewalls of the first sleeve 48 contact the eight magnets 60, respectively. A prism extends radially and outwardly from each edge of the first sleeve 48. In this embodiment, an outer side of the prism in the radial direction is planar. The eight cores 70 contact the outer sides of the prisms, respectively. An axial hole is defined in a central portion of the first sleeve 48 with the shaft 20 extending there through.

In a preferred embodiment, the first main body 42, the first short pins 44, the first long pins 46, and the first sleeve 48 are integrally formed as one piece through injection molding and the first sleeve 48 is mounted on the shaft 20 by insert molding. The shaft 20 is thus fixed in and rotates with the first sleeve 48. It should be understood that the first main body 42, the first pins 44, 46, and the first sleeve 48 can be formed separately and then assembled together and the first sleeve could be a press fit on the shaft.

In this embodiment, the first short pins 44 and the first long pins 46 each have a cross section that is oval-shape with the major axis thereof extending radially. The first short pins 44 and the first long pins 46 each are four in number and circumferentially and alternately spaced from each other.

Figure 6:
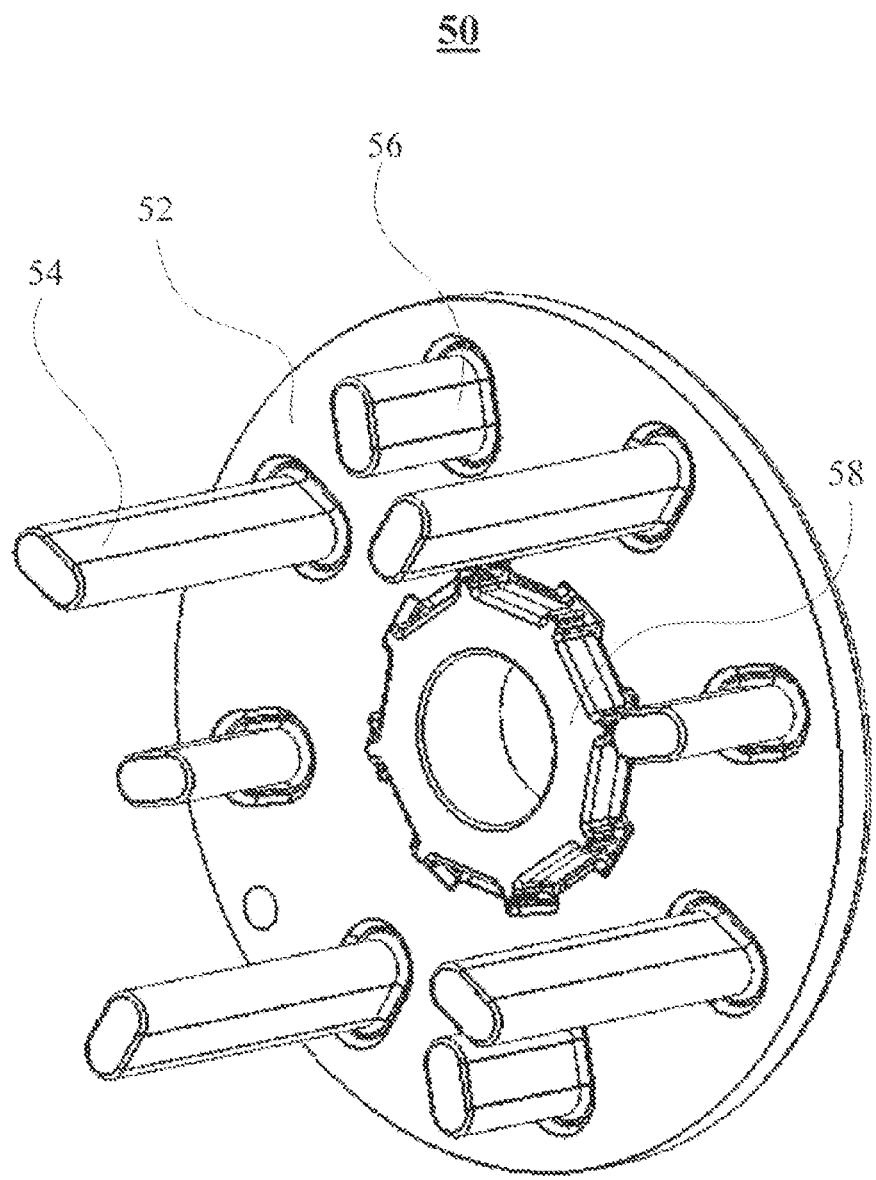
FIG. 6 is an isometric view of a second end plate of the rotor of FIG. 2.

FIG. 6 shows the second end plate 50 of the rotor 5 of FIG. 2. In this embodiment, the second end plate 50 includes a second main body 52, a plurality of second pins 54, 56, and a second sleeve 58. The second main body 52 is generally disc-shaped. The second pins 54, 56 include a plurality of second long pins 54 and a plurality of second short pins 56. The second pins 54, 56 are fixed on a surface of the second main body 52, arranged around the axis and evenly spaced from each other. Each of the second pins 54, 56 extends outwardly and perpendicularly from the surface of the second main body 52. In the axial direction, the second long pins 54 are aligned with the first short pins 44, and the second short pins 56 are aligned with the first long pins 46. The second sleeve 58 has a cross section similar to that of the first sleeve 48, but has an axial length much less than that of the first sleeve 48. The second sleeve 58 forms an extension of the first sleeve 48 and is fixed to the shaft 20. The second long pins 54 and second short pins 56 each have an oval-shape cross section, with the major axis thereof extending radially, the same as the first pins 44, 46.

The first end plate 40 and second end plate 50 are mounted from opposite ends of the shaft 20, respectively. Each first short pin 44 is coaxial with a corresponding second long pin 54, and each first long pin 46 is coaxial with a corresponding second short pin 56. Each of the cores 70 defines a through hole 72 aligned with corresponding first and second pins 44, 54 or 46, 56. In a preferred embodiment, the cross section of the through holes 72 correspond to the cross section of the first and second pins 44, 46, 54, 56.

Figure 8:
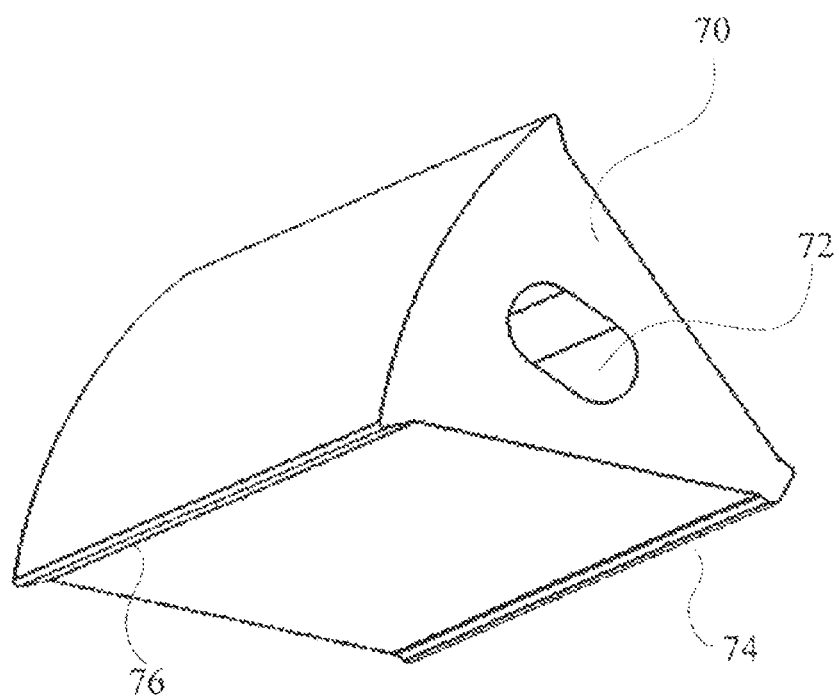
FIG. 8 is a isometric view of a core of the rotor of FIG. 2.

As shown in FIGS. 7 and 8, each of the cores 70 is generally column-shaped with a sector-shaped or triangular cross section. The through hole 72 extends axially through the core 70. An outer surface of the core 70 in the radial direction is a part of a cylindrical surface, matching with the inner surface of the housing 30 of the rotor 5. Two lateral surfaces of each core 70 are planar. An inner edge of each lateral surface of the core 70, which is adjacent to the shaft 20, extends outwardly forming an inner rib 74, and an outer edge of each lateral surface, which is adjacent to the housing 30, extends outwardly forming an outer rib 76. The inner and outer ribs 74, 76 extend axially.

Each of the magnets 60 is generally cuboid-shaped, and symmetric. The magnets 60 and cores 70 are alternating, and cooperatively form the column. The parts of the housing 30 are assembled from respective ends of the shaft 20 to cover the end plates 40, 50, and the column formed by the magnets 60 and cores 70. In one embodiment, the magnets 60 are ferrite magnets. The magnets 60 are magnetized circumferentially to make lateral surfaces thereof in the circumferential direction with corresponding polarities. Polarization directions for neighboring magnets 60 are contrary. Thus, opposite side surfaces of neighboring magnets 60 have the same polarity, which polarizes the core 70 there between with the corresponding polarity. Accordingly, alternate cores 70 have different polarities.

In this embodiment, axial length of the magnets 60 and cores 70 are generally the same. A width of the magnet 60 is generally the same as a distance between neighboring cores 70 in the circumferential direction. A radial height of the magnet 60 is slightly larger than a radial distance between the inner and outer ribs 74, 76 of the core 70.

The cores 70 surround the shaft 20 and are evenly spaced from each other. A space is defined between neighboring cores 70 for receiving one of the magnets 60 therein. The space is generally cuboid-shaped. Each of the magnets 60 are inserted into a corresponding space. The outer ribs 76 of the cores 70 clutch edges of the outer surface of the magnet 60, and the inner ribs 74 clutch edges of the inner surface of the magnet 60.

In this embodiment, the outer surfaces of the magnets 60 and cores 70 are on the same column, i.e., form a common surface, attaching to the inner surface of the housing 30. The radially inner surfaces of the magnets 60 extend inwardly beyond the inner surfaces of the cores 70. This increases a flux path between the inner surfaces of neighboring cores 70, and correspondingly decreases magnetic flux leakage. In this embodiment, chamfers are formed at the edges of the magnets 60, matching the ribs 74, 76 of the cores 70.

The first and second end plates 40, 50 are mounted on respective ends of the shaft 20. The first and second pins 44, 46, 54, 56 of the first and second end plates 40, 50 are inserted into the through holes 72 of the cores 70. In this embodiment, each of the first short pins 44 of the first end plate 40 and a corresponding second long pin 54 of the second end plate 50 are complementary in length and inserted into the same through hole 72; and each of the first long pins 46 and a corresponding second short pin 56 are complementary in length and inserted into the same through hole 72. A narrow gap, which is few millimeters, is formed between corresponding first and second pins 44, 54 or 46, 56 inside the same through hole 72, ensuring support to the cores 70. In this embodiment, the length of the first long pins 46 is twice that of the first short pins 44. It can be understood that a sum of the lengths of the corresponding first and second pins inside the same through hole 72, i.e., corresponding first long pin 46 and second short pin 56, or corresponding first short pin 44 and second long pin 54, can be the same as the length of the through hole 72, and in such a situation there is no gap between the corresponding first and second pins 44, 54 or 46, 56.

The rotor 5 is rotatably supported by one or two bearings 10 mounted on a respective end of the shaft and preferably fixed to the stator 2.

During operation of the motor, stress on the first and second pins 44; 46, 54, 56 is relief since the first and second pins 44, 46, 54, 56 of the first and second end plates 40, 50 are complementary in length, thereby avoiding stress concentration in the first and second pins 44, 46, 54, 56. Accordingly, breakage of the first and second pins 44, 46, 54, 56 and splitting inside the rotor 5 are avoided as much as possible.

In this invention, the rotor 5 is a combination of fragmented cores 70 and magnets 60. The core 70 between adjacent magnets 60 is polarized with a corresponding polarity, and alternate cores 70 have different polarities. During operation of the motor 1, lines of magnetic flux extend from one core 70 of North (N) polarity, into the stator across the air gap 3 between the rotor 5 and stator 2, then across the air gap 3 again to a neighboring core 70 of South (S) polarity. For the present invention, the housing 30 of the rotor 5, which is made of magnetically permeable materials, reduces a distance between the cores 70 and the stator 2 that the magnetic flux has to travel unsupported. Accordingly, the magnetic reluctance is reduced. Thus, magnetic flux density through the air gap 3 is increased, and a power density of the motor 1 is improved. This is contrary to conventional wisdom which avoids using magnetically permeable material to form the housing of the rotor. However, the non-magnetic housing does not support the movement of the magnetic flux thus in effect increasing the air gap by increasing the distance the magnetic flux has to travel unsupported.

Magnetic flux leakage occurs if the housing 30 of the rotor 5 is made of magnetically permeable material, which lowers the power of the motor. In fact, for a BLDC motor using a rotor with surface mounted magnets, magnetic flux leakage is serious when the housing of the rotor is made of magnetically permeable material. Thus, the housing has to use nonmagnetic material, which has no benefit to the performance of the motor other than for fixing the magnets to the rotor core. However, the nonmagnetic housing increases the reluctance of the flux path between the rotor and the stator, which can be considered as increasing the air gap of the motor, which accordingly lowers the power density of the motor.

For the present motor, the housing 30 of the rotor 5 uses magnetically permeable material, such as stainless steel. When the rotor 5 is mounted into the stator 2 to form the motor 1, the outer surface of the rotor 5 and the inner surface of the stator 2 defines a gap about 0.1 to 0.7 mm there between. That is, the air gap between the rotor 5 and the stator 2 is from 0.1 to 0.7 mm. The magnetic housing 30 results in some magnetic flux leakage but reduces the reluctance between the rotor and the stator to the reluctance of the air gap 3 between the stator 2 and rotor 5. Thus the magnetic flux between the cores 70 of the rotor 5 and the stator 2 is increased, improving the performance of the motor. Thus, the housing 30 is not only for fixing the magnets and cores, but also improves the performance of the motor 1.

Figure 9:
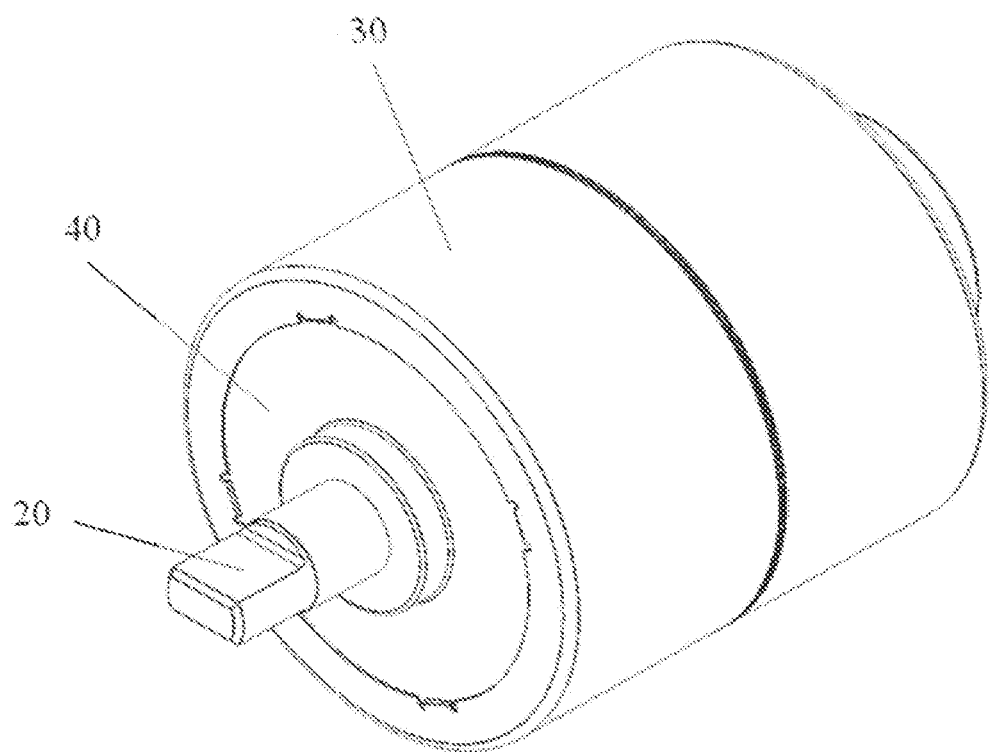
FIG. 9 is a isometric view of a rotor according to a second embodiment.
Figure 10:
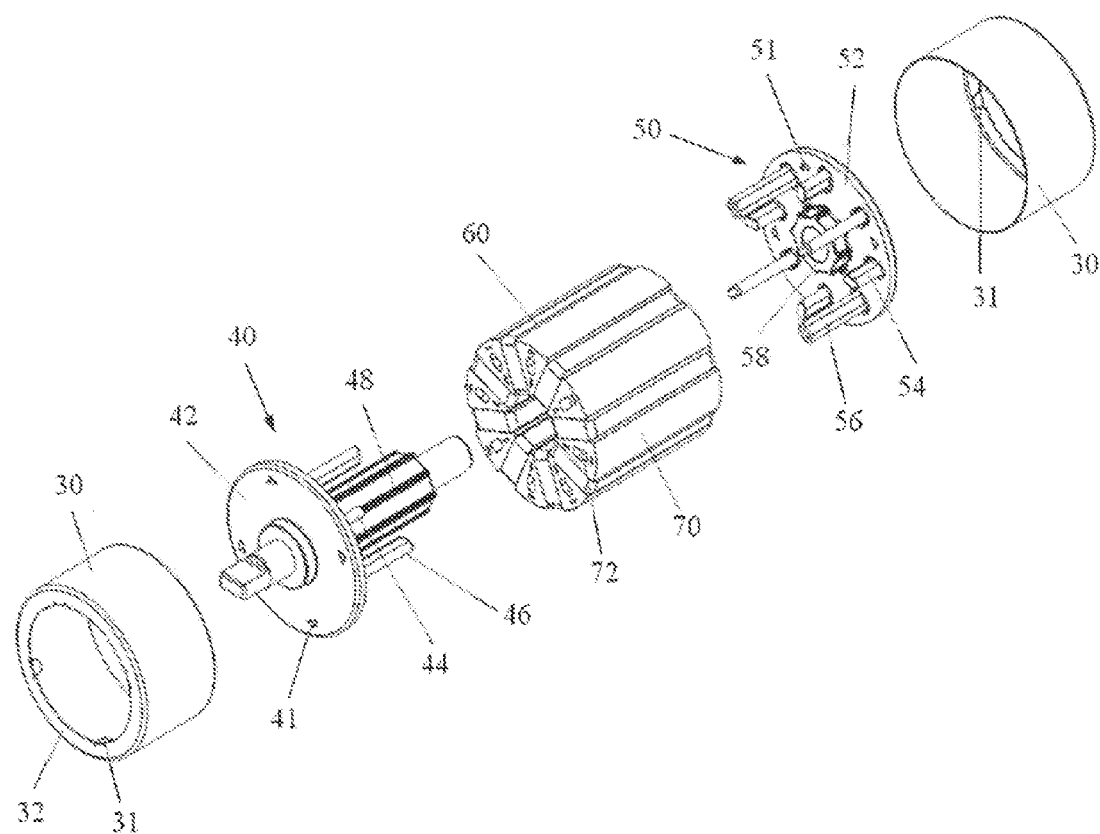
FIG. 10 is an exploded view of the rotor of FIG. 9.
Figure 11:
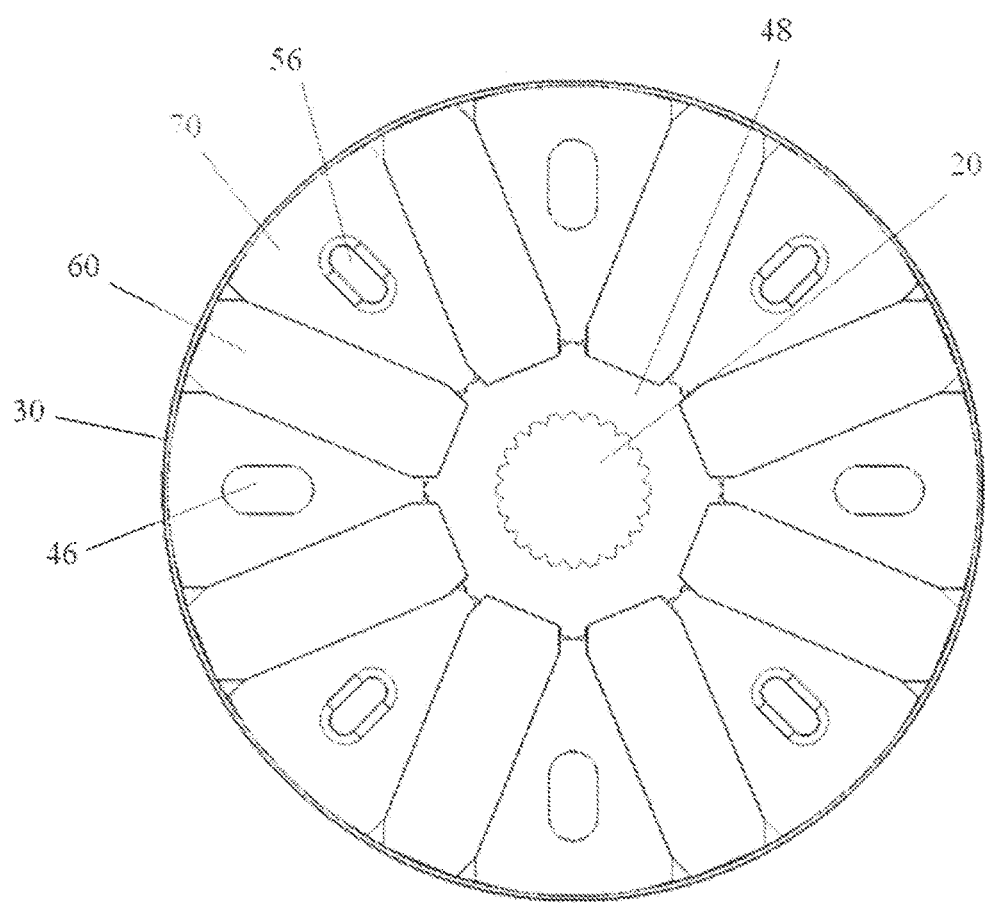
FIG. 11 shows a cross section of the rotor of FIG. 9.

FIGS. 8 to 10 show an alternative embodiment of the rotor 5, which includes a shaft 20, housings 30, end plates 40, 50, magnets 60 and cores 70.

In this embodiment, the two parts of the housing 30 are made of magnetically permeable material, such as stainless steel. The housing 30 surround the magnets 60 and cores 70. Each part of the housing 30 has a flange 32 at an axial end thereof Each flange 32 overlaps a corresponding end plate 40 or 50. In this embodiment, tabs 31 extend from each flange 32 towards the end plate 40, 50, and grooves 41, 51 are defined in the end plates 40, 50 corresponding to the tabs 31. When assembled, the tabs 31 engage corresponding grooves 41, 51 to connect the housing parts to the end plates 40, 50. Thus, the housing 30 and end plates 40, 50 are locked together, and according gluing the housings 30 to the end plates 40, 50 can be omitted, simplifying the process for making the rotor 5.

It should be understood that, in other embodiments, the grooves can be formed in the flanges 30, while the tabs can be formed on the end plates 40, 50. In addition, in this embodiment, the cores 70 have chamfers at edges of the outer surface thereof, and thus the outer surface of the cores 70 are spaced from the outer surface of the magnets 60 in the circumferential direction, which reduces magnetic flux leakage, and improves power density of the motor.

The present rotor has been described above. The magnets are inserted in the slots between the cores and magnetized circumferentially, creating cores with alternating polarities. The magnetic housing mounted around the magnets and cores reduces the effective width of the air gap, thereby increasing the flux density and improving the power density of the motor. In addition, the pins of the end plates of the present rotor with different lengths cooperate to disperse stress, which makes the pins of the end plates reliable even after a long period of operation. In addition, the first end plate and the shaft are fixed together through insert molding, and then other components are assembled, which greatly improves the manufacturing process, thereby improving the manufacturing efficiency and reducing the cost.

For the BLDC motor incorporating such a rotor, the stator can be that of a conventional brushless motor. When assembled, the present rotor is mounted inside the stator, and end caps support the ends of the shaft through the bearings, thereby forming an improved BLDC motor.

The cores 70 of the rotor are preferably laminated cores produced by stacking laminations stamped from sheet electrical steel, for example.

In the description and claims of the present application, each of the verbs "comprise", "include", "contain" and "have", and variations thereof, are used in an inclusive sense, to specify the presence of the stated item or feature but do not preclude the presence of additional items or features.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of example only, and various other modifications will be apparent to persons skilled in the field without departing from the scope of the invention as defined by the appended claims.

For example, the first/second pins can be designed to have more different lengths, such as three or more different lengths. In addition, the pins of one end plate can extend through the cores to fix directly with the other end plate. Further, the housing can be formed as one piece with one end thereof forming a flange and the other end thereof being open. When assembled, the housing is mounted around the end plates, the cores, and the magnets via the open end, and finally the open end is pressed and/or rolled to form another flange at the open end. Thus, the rotor is a pre-assembled item.

The invention claimed is:

1. A rotor of a motor, comprising:
   a shaft;
   a first end plate comprising a first main body and a plurality of first pins perpendicular to the first main body;
   a second end plate comprising a second main body and a plurality of second pins perpendicular to the second main body;
   a plurality of cores arranged between the first and second end plates, the cores being evenly spaced from each other in a circumferential direction, a space being defined between adjacent cores, each of the cores defining a through hole with one of the first pins and one of the second pins inserted therein, a sum of the lengths of the first and second pins in the same through hole being not larger than the length of the through hole; and
   a plurality of magnets, each of the magnets being received in a respective space between the cores;
   wherein the first pins comprise a plurality of first long pins and a plurality of first short pins, the second pins comprise a plurality of second long pins and a plurality of second short pins, each first long pin and a corresponding second short pin are in the same through hole, each first short pin and a corresponding second long pin are in the same through hole, a gap is defined between the first short pin and corresponding second low pin, and a gap is defined between the first long pin and corresponding second short pin.

2. The rotor of claim 1, wherein the first long pins and first short pins are alternating in the circumferential direction, and the second long pins and second short pins are alternating in the circumferential direction.

3. The rotor of claim 2, wherein the length of the first long pin is twice that of the first short pin.

4. The rotor of claim 1, wherein a cross section of the through hole corresponds to a cross section of the first and second pins.

5. The rotor of claim 4, wherein the cross sections of the first and second pins are oval-shaped.

6. The rotor of claim 1, further comprising a housing covering and surrounding the magnets and cores, the housing being made of magnetically permeable material.

7. The rotor of claim 6, wherein the housing is made of stainless steel.

8. The rotor of claim 6, wherein the housing comprises two separate cylinders.

9. The rotor of claim 1, wherein the shaft is fixed with the first end plate though inserting molding.

10. A rotor of a motor, comprising:
a shaft;
a first end plate;
a second end plate;
a plurality of cores arranged between the first and second end plates, the cores being evenly spaced from each other in a circumferential direction, a space being formed between adjacent cores;
a plurality of magnets, each of the magnets being received in a respective space between the cores, the magnets being magnetized circumferentially to make side surfaces thereof in the circumferential direction with corresponding polarities; and
a housing made of magnetically permeable material, the housing surrounding and covering outer surfaces of the magnets and cores in the radial direction.

11. The rotor of claim 10, wherein the magnet is cuboid-shaped and symmetric.

12. The rotor of claim 10, wherein at least one of the first and second end plates forms fixing pins, the cores defining through holes corresponding to the pins.

13. The rotor of claim 12, wherein the pins comprise a plurality of first long pins and a plurality of first short pins extending from the first end plate, and a plurality of second long pins and a plurality of second short pins extending from the second end plate, each of the first long pins and a corresponding second short pin being inserted in a corresponding through hole from respective ends of the core, and each of the first short pins and a corresponding second long pin being inserted in a corresponding though hole from respective ends of the core.

14. The rotor of claim 10, wherein the housing is made of stainless steel, and a thickness of the housing is from 0.1 to 0.3 mm.

15. The rotor of claim 10, wherein an inner surface of the magnet in the radial direction extends beyond the cores, the first end plate comprises a first polygonal sleeve arranged at a central portion of the first end plate, the first polygonal sleeve comprises a plurality of sidewalls and a plurality of projections respectively extending radially and outwardly from corners of the first polygonal sleeve, each sidewall contacts the inner surface of a corresponding magnet, and each projection contacts a corresponding core.

16. The rotor of claim 10, wherein one of the housing and first end plate defines a groove, and the other one of the housing and first end plate defines a tab; one of the housing and second end plate defines a groove, and the other one of the housing and second end plate defines a tab, the tabs being engaged with the grooves to connect the housing and the first and second plates together.

17. A brushless direct current motor, comprising:
a stator; and
a rotor comprising:
a shaft;
a first end plate;
a second end plate;
a plurality of cores arranged between the first and second end plates, the cores being evenly spaced from each other in a circumferential direction, a space being formed between adjacent cores;
a plurality of magnets, each of the magnets being received in a respective space between the cores, the magnets being magnetized circumferentially to make side surfaces thereof in the circumferential direction with corresponding polarities; and
a housing made of magnetically permeable material, the housing surrounding and covering outer surfaces of the magnets and cores in the radial direction.

18. The motor of claim 17, wherein an air gap between an outer surface of the housing and the stator is from 0.1 to 0.7 mm.

19. The motor of claim 17, wherein a plurality of first long pins and a plurality of first short pins extend from the first end plate, and a plurality of second long pins and a plurality of second short pins extend from the second end plate, each of the first long pins and a corresponding second short pin being inserted in a corresponding through hole from respective ends of the core, and each of the first short pins and a corresponding second long pin being inserted in a though hole from respective ends of the core.

20. The motor of claim 17, wherein the housing is made of stainless steel, and a thickness of the housing is from 0.1 to 0.3 mm.

21. The motor of claim 17, wherein the magnet is cuboid-shaped and symmetric, an inner surface of the magnet in the radial direction extends beyond the cores, the first end plate comprises a first polygonal sleeve arranged at a central portion of the first end plate, the first polygonal sleeve comprises a plurality of sidewalls and a plurality of projections respectively extending radially and outwardly from corners of the first polygonal sleeve, each sidewall contacts the inner surface of a corresponding magnet, and each projection contacts a corresponding core.

22. The motor of claim 17, wherein one of the housing and first end plate defines a groove, and the other one of the housing and first end plate defines a tab; one of the housing and second end plate defines a groove, and the other one of the housing and second end plate defines a tab, the tabs being engaged with the grooves to connect the housing and the first and second end plates together.

* * * * *